United States Patent Office 3,554,840
Patented Jan. 12, 1971

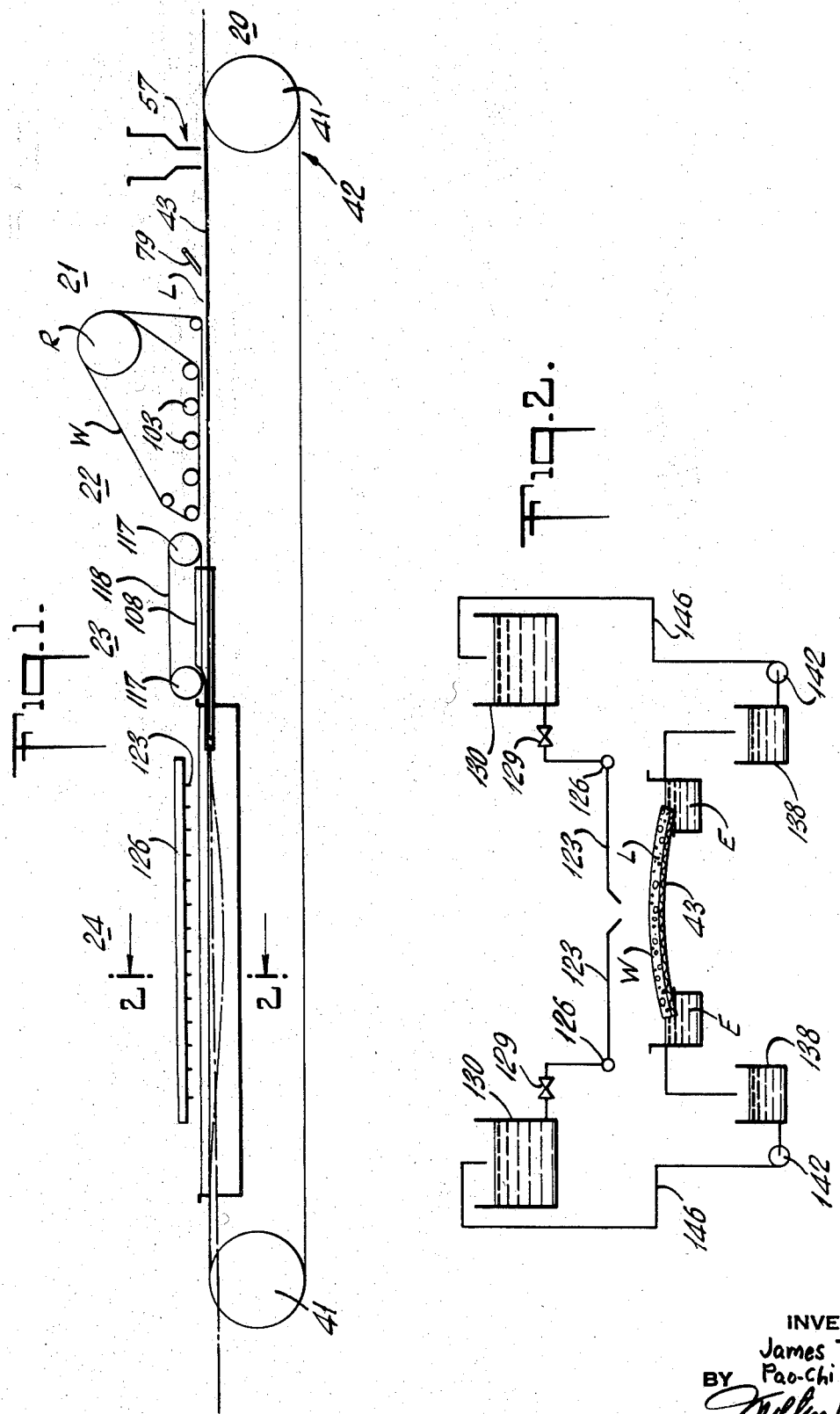

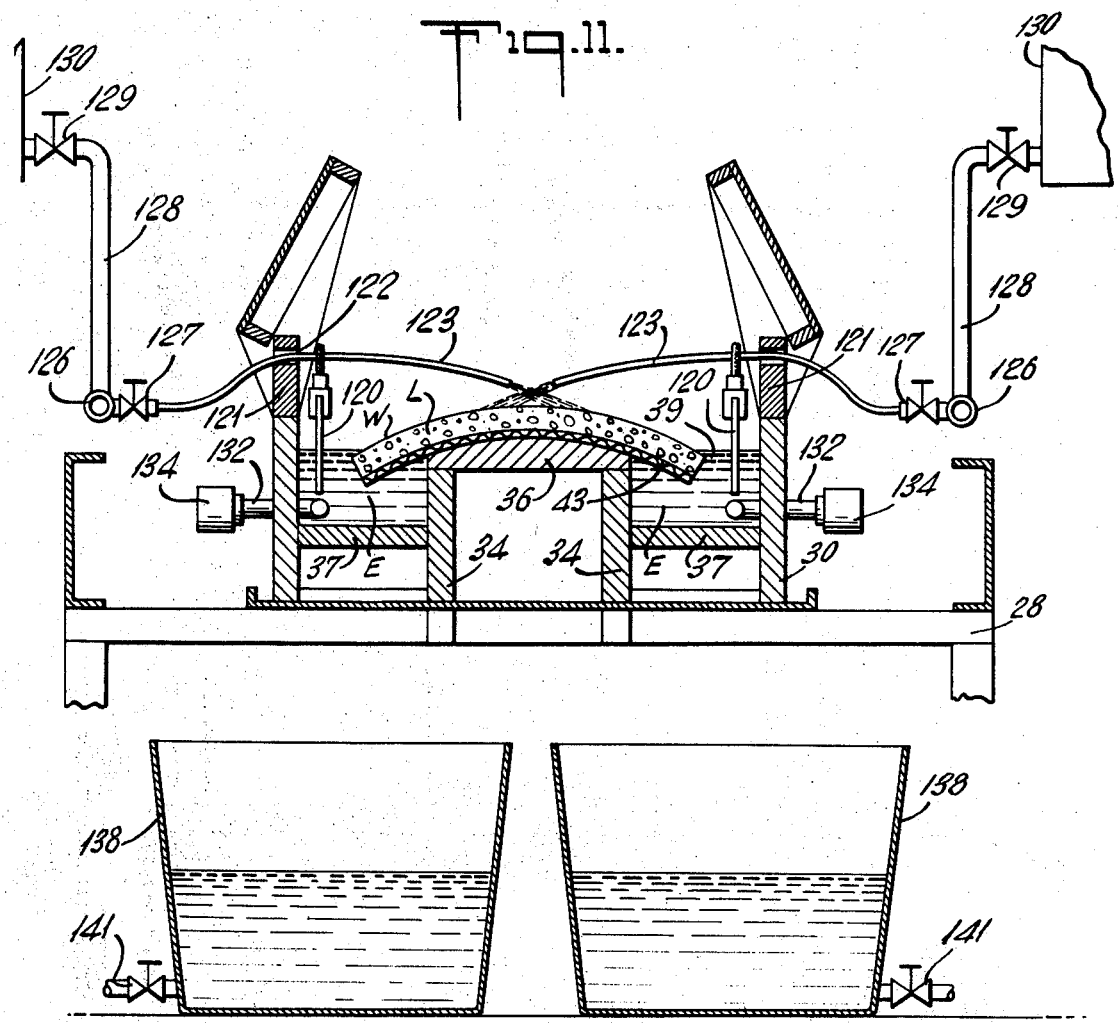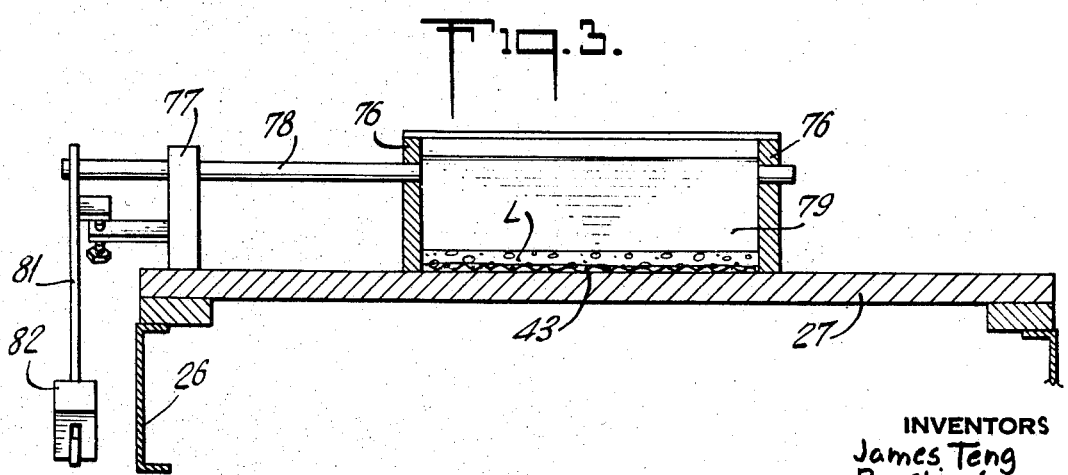

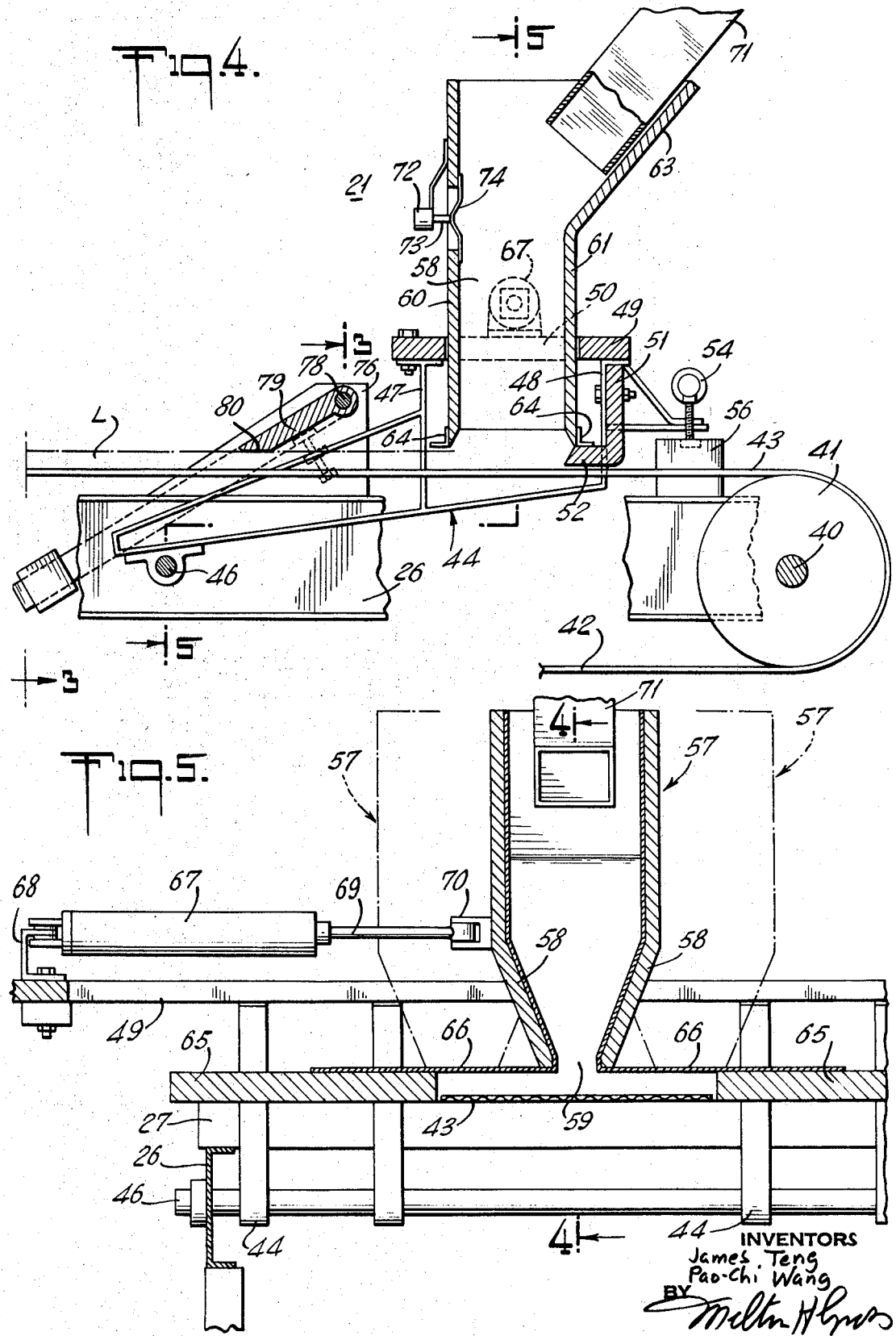

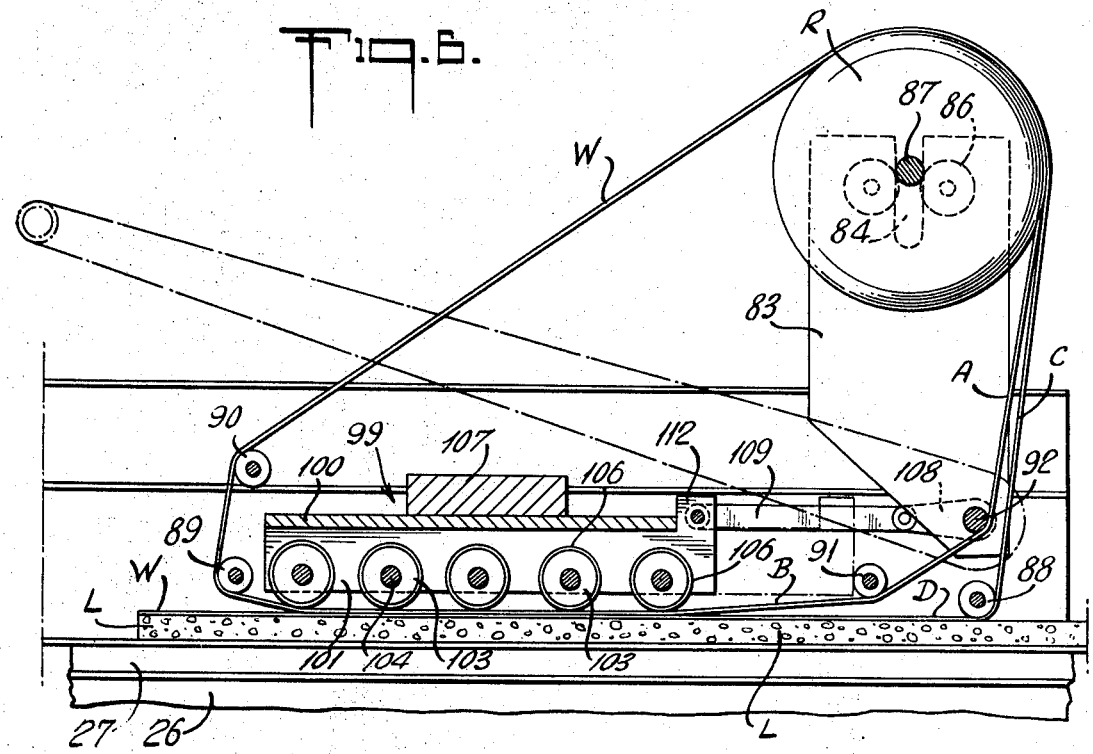
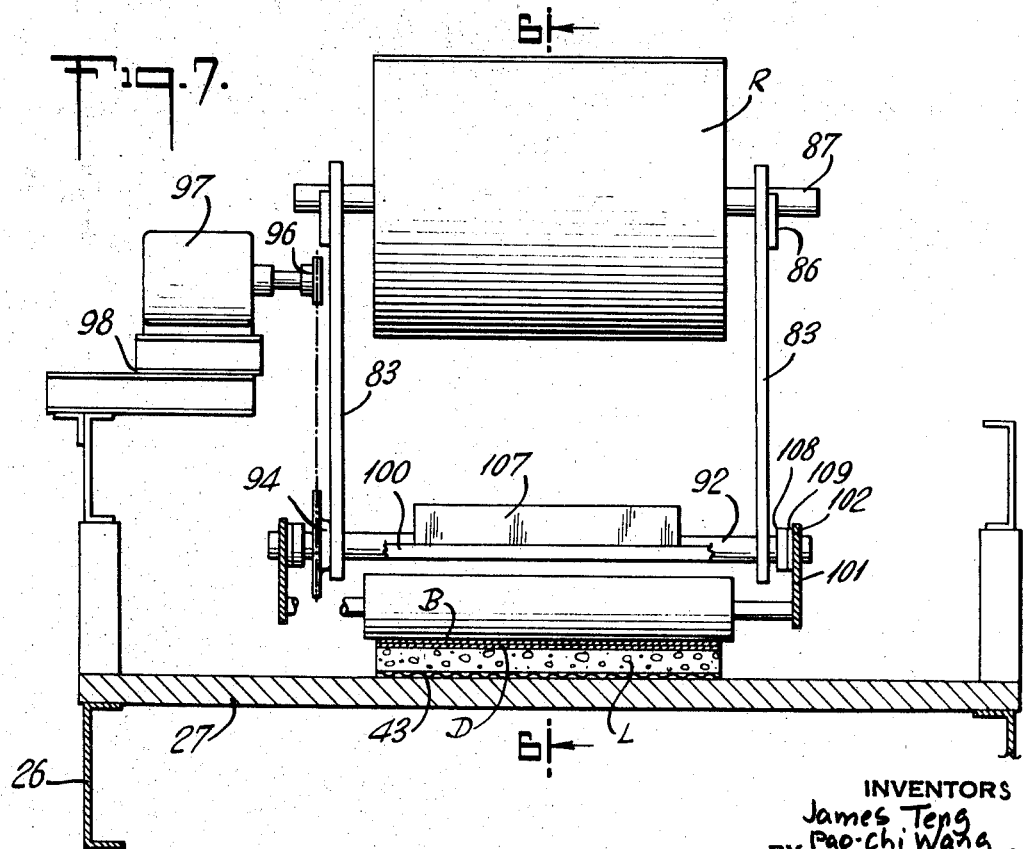

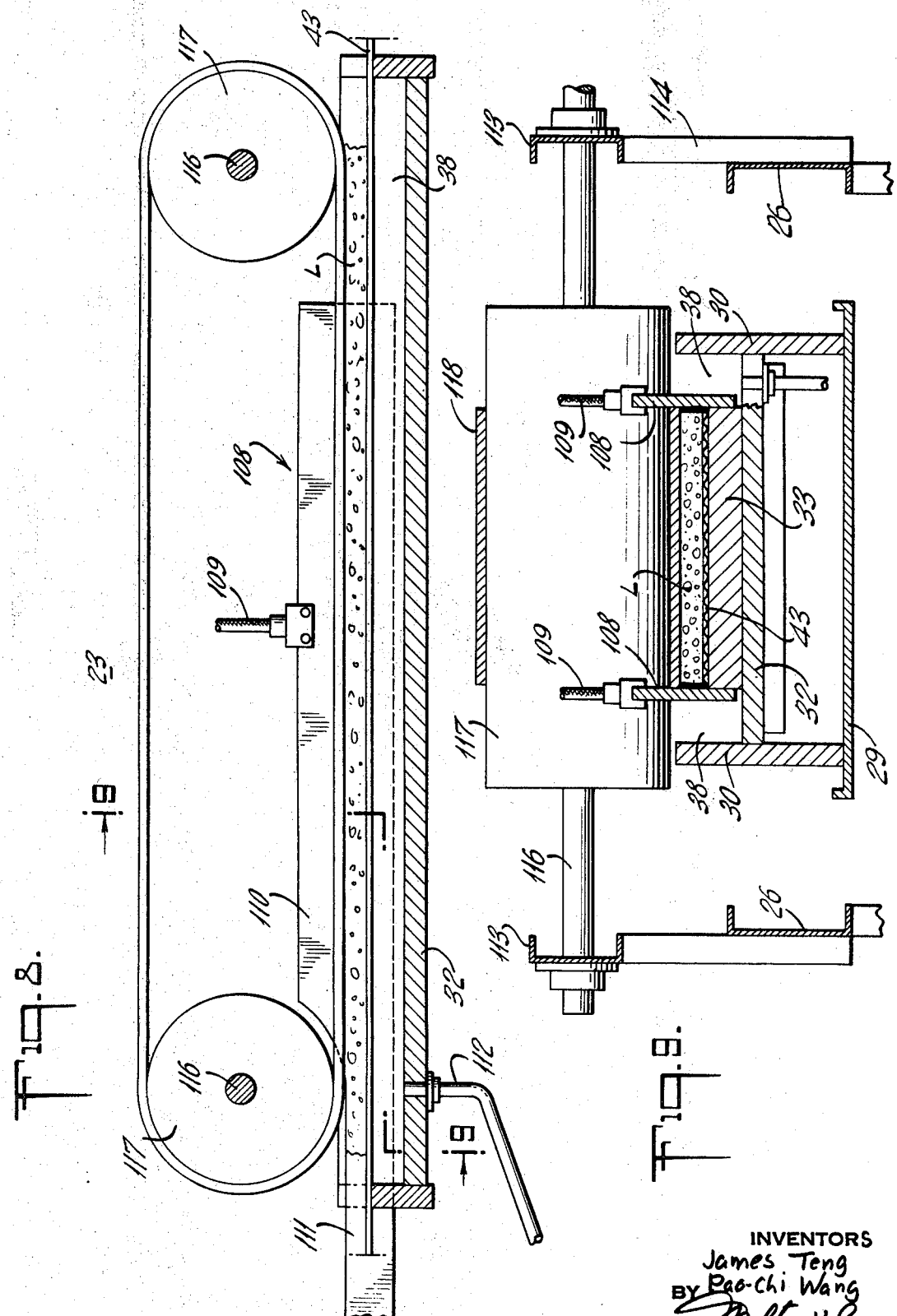

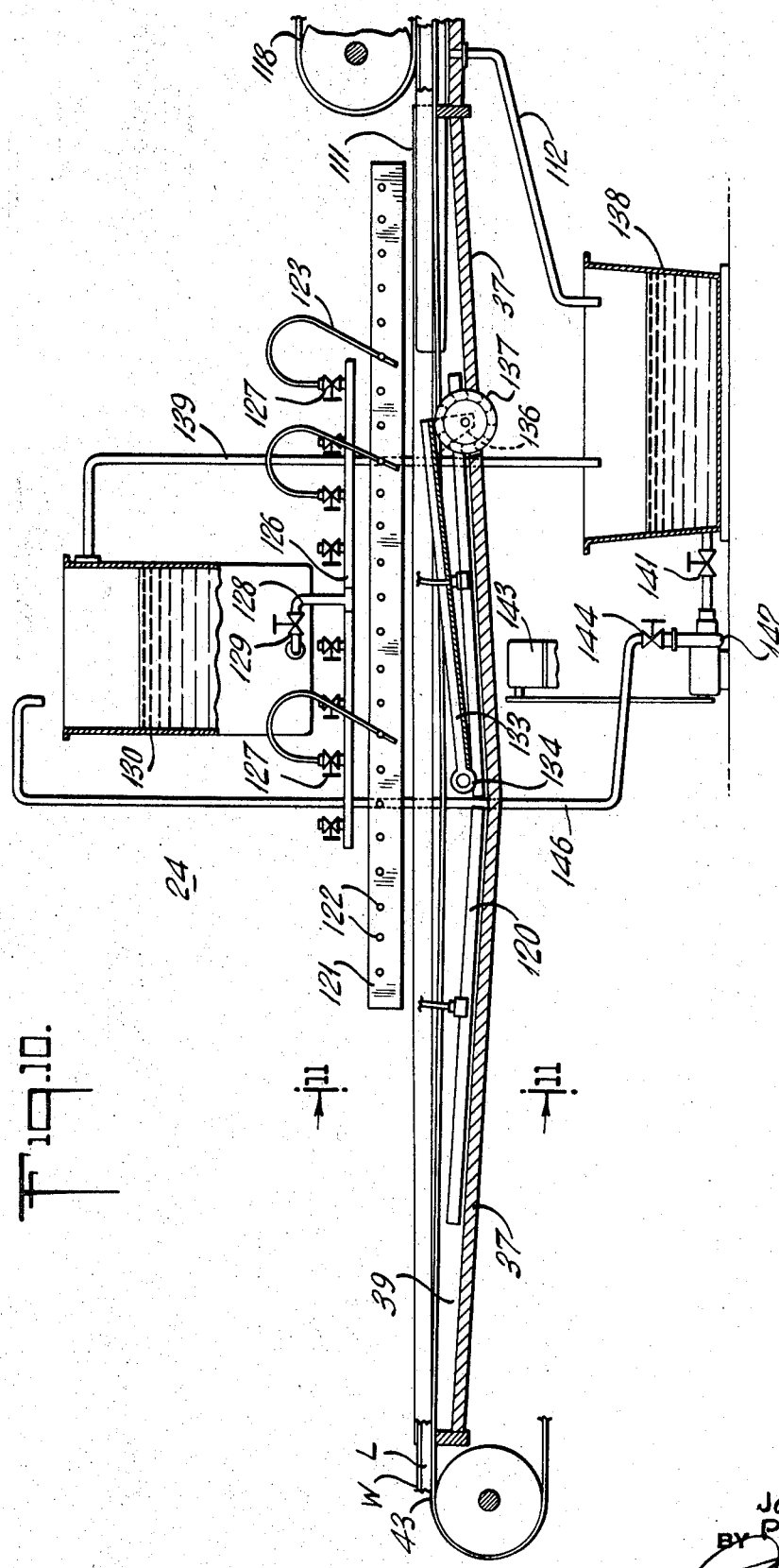

3,554,840
APPARATUS FOR THE CONTINUOUS PRODUCTION OF CELLULOSE SPONGE PRODUCTS
James Teng, Cleveland, and Pao-Chi Wang, Bay Village, Ohio, assignors to Nylonge Corporation, Cleveland, Ohio, a corporation of Ohio
Filed May 8, 1967, Ser. No. 636,822
Int. Cl. B27d 27/00, 27/06; B32b 3/12
U.S. Cl. 156—436                                    18 Claims

ABSTRACT OF THE DISCLOSURE

A transversely reciprocating hopper deposits a viscose sponge forming layer on a longitudinally advancing belt. A web to be laminated to the sponge layer is guided along a convoluted path from an inner web package and includes superimposed runs along the viscose layer the superimpoed web runs being pressed by a longitudinally reciprocating weight thereon, a single layer of the web continuing with the sponge mass layer. The laminate is transported by the belt with its opposite edges immersed in conducting liquids carried in longitudinal troughs along the belt edges and connected to an electric current which heats the viscose mass to coagulate it and regenerate the cellulose. A conducting liquid is sprayed onto the advancing web carrying sponge mass layer.

BACKGROUND OF THE INVENTION

Methods and apparatus for the production of regenerated cellulose sponge webs and laminates thereof are described in U.S. Pat. No. 3,276,072 granted Oct. 4, 1966, to A. Politzer et al., and U.S. Pat. No. 3,377,652, granted Apr. 16, 1968, to A. Politzer et al., which methods and apparatus are highly satisfactory particularly when applied to the production of relatively thick regenerated cellulose sponge webs, for example of a thickness in excess of about ⅜ inch. However, the use of the above methods and apparatus possess drawbacks and disadvantages when applied to the production of thin regenerated cellulose sponge webs. Employing the aforesaid method and apparatus, a layer of a viscose sponge forming mass containing particulate sodium sulphate as a pore forming material is deposited on an advancing belt, the sponge forming layer being longitudinally transported along and in contact with oppositely disposed longitudinally extending metal side electrodes which are connected to a voltage source. The viscose is heated by the current passing therethrough to effect the coagulation thereof and the regeneration of the cellulose and the leaching of the sodium sulphate. When employed with thin layers of viscose difficulties are encountered in effecting a continuous uniform engagement of the coagulated viscose layer by the metal electrodes. As a consequence burning may be experienced along the borders of the advancing sponge forming layer with possible damage to the sponge product and to the electrodes as well and with a likelihood of the absence of a uniform heating and treatment of the sponge mass over the full area thereof when applied to the production of the sponge webs.

Another drawback of the apparatus described in the above patent is experienced when applied to the lamination of a very thin porous web to the sponge mass to produce an article of the nature described in copending U.S. Pat. No. 3,377,643, granted Apr. 16, 1968, to J. Teng et al. The web is frequently applied in a rough and uneven manner with the sponge forming mass often seeping to the exposed face of the web.

SUMMARY OF THE INVENTION

It is thus a principal object of the present invention to provide an improved apparatus for the continuous production of regenerated cellulose products.

Another object of the present invention is to provide an improved apparatus for the production of regenerated cellulose sponge sheet.

Still another object of the present invention is to provide an improved method and apparatus for the production of a laminated sponge product.

The above and other objects of the present invention will become apparent from a reading of the following description taken in conjunction with the accompanying drawings which illustrate a preferred embodiment of the present invention.

In a sense the present invention contemplates the provision of apparatus for producing a cellulose sponge by forming a body of a viscose sponge forming mass, contacting a section of said sponge forming mass body with an electrically conducting liquid, and applying to said liquid an electric voltage at a different potential than that of another section of said sponge forming mass body to effect the flow of electric current through said mass. The improved apparatus for practicing the present process comprises an endless belt advancing longitudinally from a trailing feed section to a leading discharge end, means for depositing a layer of said sponge forming mass on said belt at said feed section, a pair of transversely spaced troughs extending longitudinally along opposite edges of said belt and adapted to contain said conducting liquid, the longitudinal borders of said belt projecting into said troughs at least along a part of the length thereof, and means for connecting said conducting liquids in said troughs to opposite terminals of a voltage source.

Another feature of the present invention resides in the apparatus for applying a web laminate to the sponge forming layer wherein the web is withdrawn from a roll thereof and directed along a first run above and in the direction of advance of the advancing sponge forming layer, rearwardly and thence along a second run sandwiched between said advancing layer and said web along said first run and pressure is applied to the outer face of the web along said first run and toward the sponge forming layer.

An improved device deposits the sponge forming layer onto the advancing belt and includes a pair of transversely spaced guide members positioned adjacent to the upper face of said conveyor belt, a feed hopper positioned above said conveyor belt, a pair of oppositely directed wing members disposed above said belt and engaging said guide members and delineating a discharge opening between them communicating with said hopper, and means for transversely reciprocating said wing members and discharge opening.

Employing the apparatus of the present invention a high quality uniform regenerated cellulose sponge sheet or a laminate including a regenerated cellulose sheet and a web layer may be continuously uniformly produced even where the sponge sheet and web are very thin and the web highly porous.

BRIEF DESCRIPTION OF THE DRAWINGS

FIG. 1 is a diagrammatic partial front elevational view of an apparatus embodying the present invention;

FIG. 2 is a sectional view taken along line 2—2 in FIG. 1;

FIG. 3 is a sectional view taken along line 3—3 in FIG. 4;

FIG. 4 is a sectional view taken along line 4—4 in FIG. 5 showing the sponge mass layer forming section in longitudinal section;

FIG. 5 is a sectional view taken along line 5—5 in FIG. 4;

FIG. 6 is a longitudinal sectional view taken along line 6—6 in FIG. 7;

FIG. 7 is a transverse sectional view of the web applying section;

FIG. 8 is a longitudinal, sectional view of the apparatus first coagulating section;

FIG. 9 is a sectional view taken along line 9—9 in FIG. 8;

FIG. 10 is a longitudinal sectional view of the apparatus main coagulating section; and FIG. 11 is a sectional view taken along line 11—11 in FIG. 10.

DESCRIPTION OF THE PREFERRED EMBODIMENT

Referring now to the drawings which illustrate a preferred embodiment of the present invention as related to the apparatus which is employed in practicing the improved process, the apparatus includes a continuously advancing conveyor section 20 along which are positioned consecutively from the trailing to the leading end thereof, a sponge forming mass layer depositing section 21, a web laminating section 22, a first sponge mass coagulating and embossing section 23, and a second sponge mass coagulating and cellulose regenerating section 24. The conveyor section 20 is of the nature and construction of the crowned belt conveyor section described in the above identified Politzer et al. patent and comprises a suitably supported mounting frame extending for the length of the conveyor section 20 and including a pair of longitudinally extending transversely spaced parallel channel members 26.

Mounted atop and extending between the channel member 26 in the area of apparatus sections 21 and 22 is a flat topped conveyor support plate 27. Following the plate 27 there is secured to the underfaces of the channel members 26, cross pieces 28 upon which is positioned a catch plate 29 which extends along the apparatus sections 23 and 24. Located on the catch plate 29 and extending longitudinally along the length thereof are a pair of vertical parallel plates 30. In the area of the first coagulating section 23 a cross plate 32 extends between and is supported by the plates 30 and has mounted thereon a longitudinally extending conveyor support member or block 33 substantially the width of the conveyor belt, as will be hereinafter described, and of a width less than that of the plate 32. The top face of the block 33 is flat and substantially coplanar with and joins the top face of the plate 27. Spaced inwardly of and parallel to the plates 30 in the area of the second coagulation section 24 are a pair of longitudinally extending transversely spaced plates 34 of lesser heights than the plates 30. A conveyor support block 36 is mounted atop the plates 34 and extends from the block 33 for substantially the full length of the coagulation section 24. The top face of the block 36 is of lesser width than the top face of the block 30 and is upwardly transversely crowned at heights which increase with distance from the block 30 at least at the trailing section thereof, preferably in the manner of the above identified Pat. No. 3,276,072 to Politzer et al. Cross plates 37 are positioned between and are secured to the confronting faces of adjacent plates 30 and 34 and extend for the full length thereof, the plates 37 being forwardly downwardly inclined and thence forwardly upwardly inclined. The plates and blocks described above are formed of an electrically insulating material. The plates 30 and 32 and the block 33 delineate a pair of opposite troughs 38 which extend along opposite longitudinal edges of the block 33 for the length of the apparatus section 23, and the plates 30, 34, and 37 delineate second troughs 39 which extend along and below opposite edges of the block 37 for the length of the apparatus section 24.

A pair of transverse shafts 40 is suitably journalled to and between the opposite ends of the channel members 26 and have drums 41 mounted thereon. An endless belt 42 formed of natural or synthetic rubber or other suitable non-conducting material extends between and is supported by the drums 41 and preferably has an embossed or patterned outer face to produce a mating surface on the product sponge. The drums 41 are suitably positively driven to advance the belt 42 along an upper run 43 extending from the trailing to the leading end of the apparatus successively along the top faces of the plate 27 and blocks 33 and 36 assuming the transverse contours of the plate 27 and blocks 33 and 36, flat along the plate 27 and block 33 and crowned along the block 36.

The sponge mass layer depositing section 21 includes a set of transversely spaced parallel similar brackets 44 positioned on opposite sides of the trailing section of the belt upper run 43 extending from below the upper run 43 rearwardly upwardly to above the run 43. The leading lower end of each of the brackets 44 is connected to a transverse shaft 46 suitably journalled to and between the channel members 26. The brackets 44 are provided at their trailing sections with upwardly directed longitudinally spaced front and rear legs 47 and 48 respectively terminating in coplanar horizontal flanges to the upper faces of which is secured a transversely extending flat rectangular frame 49 having a transversely extending slot 50 formed therein. Secured to and extending between the rear faces of the rear bracket legs 48 is a transversely extending vertical plate 51 provided along its lower edge with a forwardly projecting tack defining transversely extending flange 52 disposed vertically below the rear leg of the frame 49. The brackets 44 are thus connected as a unitary assembly with the frame 49 and the trailing end thereof is vertically adjustable by means of brackets 53 secured to and projecting rearwardly from the outer bracket legs 48 and provided with tapped vertical bores engaged by finger adjustable screw members 54 the bottoms of which bear on underlying blocks 56 located on the plate 27. Thus the level of the frame 49 and the track 52 are simultaneously adjustable by means of the screws 54.

A transversely reciprocatable hopper 57 includes a vertical conduit 58 of rectangular cross-section transversely slidably registering with the frame slot 50 and terminating in downwardly inclined walls 58 converging to a longitudinally extending narrow rectangular bottom discharge opening 59 positioned above the level of the belt upper run 43 at about the level of the top face of the track 52. The hopper 57 includes a vertical front wall 60 extending substantially along the leading leg of the frame 49 and vertical rear wall 61 extending along the trailing leg of the frame 49 and terminating at its top in a rearwardly upwardly inclined section 63. Angle members 64 are secured to the bottom outer leading and trailing borders of the discharge opening 59 and are provided along their bottoms with horizontal outwardly directed legs, that of the trailing angle member 64 engaging the track 52.

A pair of opposite transversely spaced guide plates 65 are positioned on the plate 27 and extend outwardly from opposite edges of the belt upper ring 43 for distances about equal to the width of the belt 42 and extend longitudinally along the belt side edges a distance at least coextensive with that of the hopper discharge opening 59. A pair of opposite horizontal flat plates or wing members 66 are secured to and project transversely outwardly from the bottom side edges of the hopper discharge opening 59 and slidably engage the top faces of the guide plates 65. The wing members 66 are rectangular and extend from the corresponding edges of the discharge opening 59 distances at least equal to the width of the belt 42 and extend longitudinally along the full length of the discharge opening 59. Advantageously, the level of the upper faces of the guide plates 65 are adjustable, for example by use of shims, by their replacement, or by a level adjusting mechanism of known construction.

The hopper 57 is continuously reciprocated the full width of the belt upper run 43 by means of a hydraulic cylinder 67, the free end of which is pivoted to a bracket 68 mounted on an end leg of the frame member 49. The cylinder 67 is provided with a piston connected by a rod 69 to a bracket 70 mounted on the side wall of the hopper 57. A hydraulic valve and pumping system, not shown, which may be of the arrangement described in the above identified Pat. No. 3,377,652 is provided for energizing the hydraulic cylinder 67 to effect the reciprocation of the hopper 57 the full width of the belt upper run 43. A chute 71 discharges the sponge forming mass into the hopper 57 and its discharge end is movable with the hopper 57. The feed of sponge forming mass through the chute 71 is controlled by a suitable valve which in turn is controlled by a switch 72 actuated by a rod 73 engaging the outer face of a flexible diaphargm 74 registering with an opening on the hopper wall 73, the switch 72 being actuated by the diaphragm 74 as the mass level in the hopper extends to and falls below the level of the diaphragm to maintain the height of the sponge forming mass in the hopper at about the level of the diaphragm 74.

Located forwardly of the bracket front legs 47 and mounted on the top face of the plate 27 along opposite edges of the belt upper run 43 are a pair of vertical parallel longitudinal bracket plates 76 and a parallel bracket plate 77 is mounted along a side edge of the plate 27. A transversely extending shaft 78 extends between and is journalled in the bracket plates 76 and 77 and projects beyond the bracket plate 77. A doctor blade 79 extends between the bracket plates 76 for the full width of the belt 42 and is affixed to the shaft 78 and projects forwardly downwardly thereof and terminates in a transverse horizontal flat doctor edge 80. Affixed to the free end of the shaft 78 and projecting forwardly and downwardly therefrom is a radial arm 81 which carries a weight 82 which is adjustable along the length of the arm 81 to premit an adjustment of the downward pressure of the doctor edge 80 and suitable means are provided for limiting the downward movement of the doctor blade edge 80 to an adjustable level. The underface of the doctor edge 80 is preferably parallel to the belt upper run 43 under normal operating conditions.

The laminating section 22 is located forward of the layer depositing section 21 and above the conveyor upper run 43 and includes a pair of suitably mounted vertical parallel longitudinally extending bracket plates 83 positioned outwardly and above the level of the outer edges of the belt upper run 43. A vertical slot 84 is medially formed in the top of each bracket plate 83 and is flanked by a pair of disc wheels 86 whose peripheries project into the slots 84 and rotatably support a freely rotatable transverse axle 87. Positioned below the trailing ends of the bracket plates 83 is a suitably supported freely rotatable first transverse horizontal guide roll 88 which is vertically adjustable preferably to a level approximately that of the thickness of the sponge forming layer and the web laminate. A second transverse guide roll 89 is located forward of and above the level of the guide roll 88, a third transverse guide roll 90 is positioned above and shortly rearwardly of the guide roll 89 and a fourth transverse guide roll 91 is positioned shortly above and forwardly of the guide roll 88, the guide rolls 88, 89, 90 and 91 being parallel and of lengths somewhat greater than the width of the belt 42.

A transverse shaft 92 extends between and is journalled in the trailing lower comers of the bracket plates 83 vertically above the guide roll 88 and above the level of the guide roll 91 and has affixed to an end thereof along the outer face of a bracket plate 83, a sprocket wheel 94. The sprocket wheel 94 is connected by a sprocket chain to a sprocket wheel 96 affixed to the output shaft of a slow speed suitably driven transmission 97 mounted in a support assembly 98. A roll R of a laminate web W, which may be a thin open pore or retiform polyurethane foam sheet of the nature of that set forth in the above identified Teng et al. patent, is carried by the axle 87 between the bracket plates 83. In the operation of the present apparatus in the production of a laminated product the web W is guided along a path from the rear of the roll R downwardly along a run A to along the rear of the shaft 92 and the bottom of the guide roll 91 and thence forwardly along a first web advancing run B to the guide roller 89, around the lower leading face thereof and then upwardly about the upper leading face of the guide roll 90. From the guide roll 90 the web W travels around the upper and rear face of the web roll R and then downwardly along a run C rearwardly of the run A and about the rear and bottom face of the guide roller 88 from which it travels forwardly along a run D underlying the web run B and superimposed on the layer L of sponge forming mass advanced by the conveyor belt run 43.

A web pressing mechanism is located between the rollers 89 and 91 and comprises a freely vertically movable carriage frame 99 of a length less than the distance between the rollers 89 and 91 and including an upper cross web 100 of greater width than the belt 42 and longitudinal flanges 101 depending vertically from the side edges of the cross web 100, the flanges 101 being provided at their trailing ends with upwardly projecting ears 102. A plurality of longitudinally spaced parallel transverse freely rotatable press rolls 103 are mounted on transverse axles 104 supported by and between the flanges 101, the bottom faces of the rolls 103 laying in a common plane positioned below the bottom edges of the flanges 101. Each of the pressure rolls is covered by a soft elastomeric sleeve 106, for example, formed of a foamed polyurethane, and the carriage frame and rollers are urged downwardly by a replaceable weight 107 positioned on the cross-web 100 to adjustably control the downward force on the pressure rolls 103.

A pair of parallel similar radial crank arms 108 are affixed to opposite ends of the shaft 92 and are coupled to the carriage 99 by similar connecting rods 109 pivotally connected at opposite ends to the ears 102 and the free ends of the crank arms 108 respectively. Thus with the rotation of the shaft 92 the carriage 99 is longitudinally reciprocated, the rolls 103 bearing downwardly under the pressure of the weight of the carriage and rolls 103 and the weight 107 and press rolling the web W along its upper run B which in turn applies pressure to the underlying advancing run D of the web W to uniformly smooth and press the web W into the top face of the sponge forming layer L which draws the superimposed web W therewith. By reason of the intervening web run B between the rolls 103 and the deposited web run D, the passage of the sponge forming mass to the rolls L is substantially eliminated by the web run B which is continuously replenished and advances to run D where it is applied to the sponge forming layer L and, in addition, the pressure on the web run D is more uniformly effected.

The first coagulating section 23 is of the nature and construction of the corresponding section described in the above identified Politzer et al. Pat. No. 3,377,652 and includes a pair of elongated parallel electrodes 108 extending along opposite edges of the conveyor belt upper run 43 and projecting above the level thereof. The electrodes 108 are connected by cables 109 to the opposite terminals of a suitable source of alternating current and each includes a main section 110 and a leading section 111 of reduced height the lower borders of the electrodes 108 registering with the troughs 38 and terminating at points above the bottoms thereof. Pipes 112 communicate with the bottoms of the troughs 38 through openings in the plate 32 and drain the liquid therefrom.

A support frame includes longitudinally extending beams 113 mounted on the channel members 26 in the region of the electrodes 108 by means of opposing pairs of posts 114. The support frame beams 113 are simultaneously vertically adjustable in any suitable manner and carry longitudinally spaced pairs of aligned bearing blocks in each of which pair is journalled a horizontal transverse shaft 116. Affixed to each of the shafts 116 is a drum 117, and an upper endless belt of the width of the belt 42 and formed of reinforced rubber or other suitable material is carried by and between the drums 117, the outer face of the belt 118, being advantageously embossed with any desired pattern and having a bottom run disposed above and advancing in the direction of and at the same speed as that of the belt upper run 43. Suitable means, for example of the structure described in the Politzer et al. Pat. No. 3,377,652 is provided for driving the drums 117 at the same peripheral speeds as the drums 41. The trailing drum 117 trails the electrodes 108 with its bottom periphery between the levels of the belt run 43 and the upper edges of the electrodes 108 and the leading drum 117 registers with the trailing parts of the electrode leading sections 111 shortly above the edges thereof. It should be noted that the embossing belt 118 and the laminating section 22 are preferably alternatively employed by raising the belt 118, as aforesaid with its bottom run above the level of the web carrying sponge forming layer L or by removing the carriage 99 and discontinuing the web feed respectively. When used, the section 23 operates in the manner of the corresponding structure described in the copending Politzer et al. application.

The coagulating and regenerating second section 24 is characterized by the provision of liquid electrodes in accordance with the present invention and includes the troughs 39 along opposite borders of the conveyor belt upper run 43 along opposite side borders along the crown section thereof overhang and extend downwardly from the top face of the block 36 into the troughs 39. The troughs 39 are delineated from the troughs 38 by transverse partition walls 119, the electrode leading sections 111 projecting forwardly through slots in the walls 119 into the troughs 39. A pair of elongated electrodes 120 are located in each of the troughs 39 and extend along and parallel to the bottom walls 37 and are connected by cables to the same terminals of the alternating current source to which the respective longitudinally spaced adjacent electrodes 108 are connected.

Mounted on each of the plates 30 and extending along the legnth thereof is a spray pipe support block 121 having regularly longitudinally spaced apertures 122 formed therein, the apertures in the block 121 being relatively longitudinally staggered. A transversely extending spray pipe 123 projects through each of the openings 122 and terminates in an oppositely downwardly tranverely directed discharge opening or spray nozzle at its outer end positioned above the crowned belt upper run 43 at a point short of its medial longitudinal axis. The spray pipes 123 of each set thereof supported by a common block 121 communicate with the spaced outlets of a longitudinally extending distributing pipe manifold 126, each of the pipes 123 being connected to the manifold 126 through an individual flow control valve 127. Each manifold is connected through a pipe 128 and a control valve 129 to the bottom outlet of a respective head tank and liquid reservoir 130 suitably mounted at a level above that of the spray pipes 123.

An adjustable overflow system is associated with each of the troughs 39 and includes a horizontal transverse pipe 132 communicating with the bottom of the trough 39 and a longitudinal pipe 133 connected to the outer end of the pipe 132 by a swingable coupling 134 is upwardly rearwardly inclined, to an open discharge end whose height is adjustable by any suitable means to thereby control the liquid level in the trough 39. The discharge end of the pipe 133 is preferably adjusted to provide a liquid level in the trough 39 at about that of the upper side edge of the sponge. forming layer L. Depending from the free end of the pipe 133 are a pair of brackets 136 which rotatable support a bucketed water wheel 137 directly below the free end of the pipe 133 so that any liquid discharged therefrom falls on the water wheel 137. The water wheel 137 breaks up the liquid flow discharged from the pipe 133 into separate discrete volumes which are dropped by the water wheel 131 and thereby prevents any electrical connection being effected by the liquid discharged from the pipe 133.

An open topped tank 138 is located below each water wheel 137 to receive the liquid dropped therefrom, and the drain pipe 112 of a respective trough 38 discharges into the tank 138. An overflow pipe 139 communicating with the upper part of the tank 130 also discharges into the tank 138. Communicating with the bottom of each tank 138 is an outlet pipe 140 connected through a valve 141 to the inlet of a centrifugal pump 142 which is driven by a suitably mounted electric motor 143 coupled to the pump 142 by a drive belt. The outlet of the pump 142 is connected through a valve 144 to a pipe 146 which extends upwardly and discharges into the top of the tank 130. It is important to note that the liquid spray and circulating systems each including troughs 38 and 39, tanks 130 and 138, pump 142, manifold 126 and the associated pipes and valves are electrically isolated from each other so that the flow of current consequent to the connection of the electrodes to the opposite terminals of a voltage source is confined substantially to that flowing through the sponge forming layer L as it is conveyed by the belt upper run 43, and the liquid carried thereby.

Considering now the operation of the apparatus described above, the trough 57 carries a viscose sponge forming mass at a height continuously maintained at the level of the diaphragm 74, as earlier described, the sponge forming mass containing viscose, reinforcing fibers and pore forming sodium sulphate dechydrate in a particulate state depending on the desired pore size and distribution. The hopper 57 is transversely reciprocated substantially the width of the belt 42 to deposit successive layers of sponge forming mass on the trailing section of the belt upper run 43 whereby to effect a transverse orientation of the deposited mass by reason of the extrusion thereof, through the relatively narrow opening 59 and the wiping action effected by the reciprocation wing member 66 over the underlying surface of the sponge mass. The transversely oriented mass is conveyed by the belt upper run 43 past the doctor blade 79, the doctor edge of which levels the upper face of the sponge forming layer L and imparts a longitudinal orientation thereto.

The sponge forming layer L is conveyed through the laminating station 22 and its upper surface engages the underface of the web W along the run D and draws the web W therewith. The roll supporting carriage is longitudinally reciprocated by the crank 108 over the upper face of the web W along its run B to reciprocate the downwardly weighted roll 103 and uniformly press the web W along run D into sponge forming layer L for a small fraction of the thickness of the web W. Any of the sponge forming mass from the layer L which may seep through the web W along the run D will be picked up by the web W along the run B and prevented from reaching the rollers 103 or sleeves 106. Any sponge forming mass which is picked up by the web run B, which is generally very little, is carried in its passage around the guide rollers 80, 89 and 90 and web roll R, with its underface which may pick up sponge forming mass, outwardly directed so as not to transfer any of the mas to the guide rollers and web roll and is then applied with the mass carrying face superimposed on the sponge forming layer L. The penetration of the web W into the sponge forming layer L may be controlled by varying the weight 107.

In the production of a laminated product, the embossing belt 118 is deactuated and its bottom run raised above the level of the web superimposed sponge forming layer L. Moreover, the electrodes 108 may be deenergized by opening the electrical circuit thereto. If the electrodes 108 are energized coagulation of the sponge forming layer is at least partially effected in the first coagulating section 23 and if not energized no appreciable coagulation is effected in the section 23. Following the section 23 the web carrying layer L is conveyed by the belt upper run 43 through the coagulating and regenerating section 24 along which section the belt upper run 43 is transversely crowned with the side borders thereof and that of the sponge forming layer L being immersed in the electrically conducting liquid E carried by the troughs 29. Thus, the opposite borders of the sponge forming layer L are connected to the opposite terminals of the alternating current source through the respective liquid electrodes E and the solid electrically conducting electrodes 120 so that the sponge forming layer borders are at different potentials to thereby effect the flow of current through the sponge forming layer L to cause the heating thereof and effect the complete coagulation of the sponge forming layer L and the regeneration of the cellulose therein. In addition, the heating of the sponge forming layer L, which is advantageously to a temperature of about 100° C., also causes the liquification of the pore forming sodium sulfate and its solution, with the consequent leaching thereof and the flow of the resulting sodium sulfate solution into the troughs 39 which flow is greatly promoted by the crowning of the belt upper run 43. In order to compensate for the loss of electrically conducting solution from the sponge forming layer with the consequent increase in the electrical resistance thereof and in order to insure a uniform heating of the sponge forming layer L and a uniform end product, a conducting liquid is sprayed onto the sponge forming layer following the coagulation thereof. The liquid is sprayed by the pipes 23 onto the crown of the layer L and flows downwardly through the layer and replaces the liquid which continuously flows therefrom to maintain the layer L substantially saturated with the liquid and hence uniformly conducting and heated and preventing any local overheating and burning. The liquid is sprayed onto the layer L from alternately staggered spray pipes 123 and the resulting electrical shorting. The liquid E advantageously contains the solutes leached from the layer L and may be in equilibrium therein or may be modified, for example, by metering water into the tanks 130 or 138 to maintain a predetermined solute concentration. The liquid E overflowing the troughs 39 through the pipes 132 is discharged into the tanks 138 and from there pumped into the respective head tanks 130 from which it is fed to the spray pipes 123. Excess liquid may be continuously removed from the tanks 138 for recovery or other purposes and any modifications of the liquids E may be continuously effected in the tanks 130 or 138. The finished product is continuously separated from the leading end of the conveyor belt 42 and further processed and treated in any known or suitable manner.

In the production of an unlaminated regenerated cellulose sponge the carriage 99 and the web roll R are removed, the embossing web 118 lowered and driven to engage and impress the upper surface of the sponge forming layer L, and the electrodes 108 energized. In all other respects the operation of the apparatus is as described above, without the use of the laminating section 22, the embossing section and coagulating section 23 operating in the manner of the corresponding apparatus described in the copending Politzer et al. application.

In accordance with a specific example of the present invention as applied to the production of a laminated product of the nature described in the Teng et al. patent the sponge forming mass contained 600 parts viscose (cellulose content 8.5%), 35 parts hemp fibers and 1400 parts sodium sulfate crystals. The belt 42 was advanced at a rate of between 17 and 25 inches per minute and a layer L of ⅛ to ¼ inch thickness was deposited thereon by the hopper 57 which had a discharge opening 59 of ⅛ to ¼ x 31 inches and was reciprocated 15 strokes per minute. The web W was ¹⁄₁₆ inch thick polyurethane open pore sponge sheet of 60 pores per inch and the pressing carriage 99 weighed 35 pounds, had 6 rollers 103 with 4-inch center-to-center spacing and was reciprocated 30 6-inch strokes per minute and the rollers 103 were 3-inch diameter with ¼ inch thick polyurethane sponge sleeves. The length of the section 24 as delineated by the troughs 39 was 144 inches long and 6 staggered spray pipes 123 were provided with a spacing of 15 inches between successive pipes starting 90 inches from the trailing ends of the troughs 39. At the trailing end of section 24 the belt run 43 was flat and from there the belt assumed a transverse crown with gradually increasing height until it reached a height of 3.5 inches at 144 inches from the trailing end of the section 24. The pipes 123 of each opposite set thereof delivered liquid to the layer L at a rate of ½ gallon per minute, the liquid E being continuously diluted with water to provide a composition of about 18 to 24% $Na_2SO_4$, 2 to 5% NaOH, and ½ to 1% $Na_2S$. A 60 cycle alternating current voltage was applied between the electrodes 120 and the current consumption through a 31-inch wide layer L was about 210 amperes.

A highly uniform laminated sponge product of excellent quality was produced. The problem of uniform contact between the mass layer and electrodes was solved and electrode corrosion cleaning and maintenance substantially eliminated and the need for close operating tolerances was obviated. Moreover, burning and overheating of the layer L both locally and generally was also eliminated. Equally good results are also achieved in the production of non-laminated sponge with the above method and apparatus as described above. It should be noted that whereas the liquid E having the above solutes are most convenient to employ, electrically conducting liquids of other compositions may be used.

While there have been described and illustrated preferred embodiments of the present invention, it is apparent that numerous alterations, omissions and additions may be made without departing from the spirit thereof.

What is claimed is:

1. An apparatus comprising an endless belt advancing longitudinally from a trailing feed section to a leading discharge end, means for depositing a layer of sponge forming mass on said belt at said feed section, a pair of transversely spaced troughs extending longitudinally along opposite edges of said belt and adapted to contain conducting liquid, means for upwardly crowning said belt along a length thereof between said troughs, the longitudinal borders of said layer projecting into said troughs at least along a part of the length thereof and means for connecting said conducting liquids in said troughs to opposite terminals of a voltage source.

2. The apparatus of claim 1 including means for applying an electrically conducting liquid to said layer of sponge forming mass on said belt.

3. The apparatus of claim 1 wherein the longitudinal borders of said belt projects into said trough at least along a part of the length thereof.

4. The apparatus of claim 1 comprising a pair of transversely spaced electrodes extending longitudinally along opposite borders of said belt proximate the trailing section thereof, and means for connecting said electrodes to a source of current.

5. The apparatus of claim 1 including means for superimposing a web on said sponge forming mass on the trailing section of said belt forward of said depositing means.

6. An apparatus comprising an endless belt advancing longitudinally from a trailing feed section to a leading discharge end, means for depositing a layer of sponge forming mass on said belt at said feed section, a pair of transversely spaced troughs extending longitudinally along opposite edges of said belt and adapted to contain conducting liquid, the longitudinal border of said layer projecting into said trough at least along a part of the length thereof, means for connecting said conducting liquids in said troughs to opposite terminals of a voltage source, a pair of overhead tanks, means for circulating liquid from each of said troughs to a corresponding one of said tanks, and means connected to each of said tanks for directing liquid from said tanks onto the layer of sponge forming mass on said belt.

7. A laminating apparatus comprising a conveyor belt, means for longitudinally advancing said conveyor belt, means for depositing a solidifiable layer of a fluid material on said advancing belt, means for superimposing a web on said solidifiable layer, pressure applying means bearing downwardly toward the upper face of said web, and means for longitudinal reciprocating said pressure applying means.

8. The apparatus of claim 7, wherein said pressure applying means comprises a transversely extending roller.

9. The apparatus of claim 7 wherein said pressure applying means comprises a carriage member and a plurality of longitudinally spaced parallel transverse rollers rotatably supported by said carriage member and engaging said web upper face.

10. The apparatus of claim 9 wherein said rollers are provided with peripheral faces formed of a resilient compressible material.

11. The apparatus of claim 7 including a source of said web, said web traversing a path above said belt from said source along a first run in the direction of advance of said belt, rearwardly and then forwardly along a second run in the direction of advance of said belt between said first run and said fluid layer, said pressure applying means being positioned above said first run of said web.

12. The apparatus of claim 11 wherein said first and second web runs are connected by a run extending from the leading end of said web source to the trailing end of said second run.

13. A feed device comprising a conveyor belt, means for longitudinally advancing said conveyor belt along the length thereof, a pair of transversely spaced guide members positioned adjacent to the upper face of said conveyor belt, a feed hopper positioned above said conveyor belt, a pair of oppositely directed wing members disposed above said belt and engaging said guide members and delineating a discharge opening between them communicating with said hopper, and means for transversely reciprocating said wing members and discharge opening.

14. The feed device of claim 13 wherein said discharge opening is formed in the bottom of said hopper and said hopper is reciprocated with said discharge opening.

15. The feed device of claim 13 wherein said discharge opening comprises a longitudinally extending slot.

16. The feed device of claim 13 wherein the underfaces of said wing members are horizontally coplanar and slidably engage said guide members.

17. The feed device of claim 13 including a doctor member positioned forwardly of said wings above said belt top face.

18. A laminating apparatus comprising a conveyor belt, means for longitudinally advancing said conveyor belt, means for depositing a solidifiable layer of a fluid material on said advancing belt, means for superimposing a web on said solidifiable layer including a source of web and means for guiding said web from said source along a path above said belt from said source along a first run in the direction of advance of said belt, rearwardly and then forwardly along a second run in the direction of advance of said belt between said first run and said belt, and pressure applying means positioned above said first run of said web and bearing downwardly toward the upper face of said web along said first run.

References Cited

UNITED STATES PATENTS

| | | | |
|---|---|---|---|
| 3,142,714 | 7/1964 | Politzer et al. | 156—79X |
| 3,163,689 | 12/1964 | Ives | 156—436 |
| 3,216,849 | 11/1965 | Jacobs | 156—79 |
| 3,345,439 | 10/1967 | Everard et al. | 156—79 |

BENJAMIN A. BORCHELT, Primary Examiner

T. H. WEBB, Assistant Examiner

U.S. Cl. X.R.

156—79